W. P. MARBLE.

VALVE HANDLE.

APPLICATION FILED MAY 15, 1909.

Reissued June 29, 1909.

12,982.

Witnesses.
C. B. Garnett
J. Murphy

Inventor:
Walter P. Marble
by Jas. H. Schmehill
Atty.

THE NORRIS PETERS CO., WASHINGTON, D. C.

UNITED STATES PATENT OFFICE.

WALTER P. MARBLE, OF CAMBRIDGE, MASSACHUSETTS.

VALVE-HANDLE.

No. 12,982. Specification of Reissued Letters Patent. Reissued June 29, 1909.

Original No. 899,118, dated September 22, 1908, Serial No. 411,390. Application for reissue filed May 15, 1909. Serial No. 496,326.

*To all whom it may concern:*

Be it known that I, WALTER P. MARBLE, a citizen of the United States, residing in Cambridge, county of Middlesex, and State of Massachusetts, have invented an Improvement in Valve-Handles, of which the following description, in connection with the accompanying drawings, is a specification, like characters on the drawings representing like parts.

This invention relates to a valve handle of that class which is detachable from the valve stem, and has for its object to provide a simple, inexpensive and efficient handle of the character described.

In accordance with this invention, the valve handle is composed essentially of two members, one of which is preferably made of wood or other non-metallic material, and the other of which is made of a material which is softer and capable of being forced or poured into an opening in the non-metallic member and which material hardens when cooled, such as a soft metal or composition of metals, said second member being secured to the first-mentioned member and provided with an opening through it for the passage of the upper end of the valve stem. Provision is also made for reinforcing both members as will be described. These and other features of this invention will be pointed out in the claims at the end of this specification.

Figure 1:
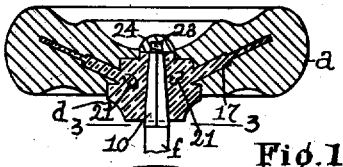
Figure 2:
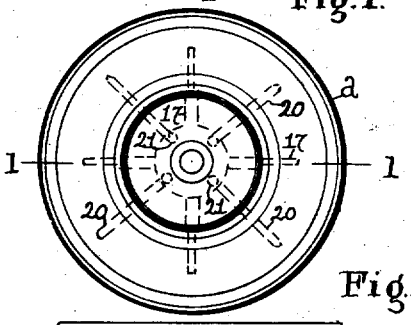
Figure 3:
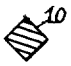
Figure 4:
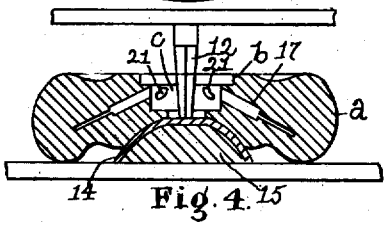

Figure 1 is an elevation of a portion of a valve stem provided with a handle embodying this invention, said handle being shown in section. Fig. 2, a plan view of the handle shown in Fig. 1. Fig. 3, a cross-section on the line 3—3, Fig. 1. Fig. 4, a sectional view of the handle proper to illustrate the manner of filling the chamber within it with the softer metal, and Fig. 5, a sectional view of the handle removed from its stem.

Referring to the drawings, *a* represents one member of the handle, which may and preferably will be of wood or other non-metallic material.

The member *a* is provided with an opening *b* extended through it, which opening is preferably of different diameters, it being of substantially small diameter at the upper side of the member *a* and materially wider within the same and at the lower side thereof. The portion of the opening *b* within the member *a* forms a chamber *c*, which is filled as will be described with a plastic or fluid material *d*, which hardens when cooled to form the second member of the handle, which is provided with an opening *e* through it for the reception of the upper part of the valve stem *f*, which latter at its upper part may be square or angular in cross-section as represented.

The material or member *d* preferably fills the chamber *c*, and the opening *e* is preferably substantially central with relation to the member *a*. The opening *e* conforms in cross-section to the form of the upper part 10 of the valve stem *f*, and this result may be effected by inserting into the opening *b* in the member *a*, a former 12 (see Fig. 4) of the same shape as the upper end 10 of the valve stem, and then filling the opening with softer material, such as a soft metal composition or it may be a plastic material such as cement which hardens when cooled. Suitable means are provided to close the narrower end or mouth of the opening *b* while it is being filled, and this result may be accomplished in any suitable manner, as, for instance, by means of a curved metal plate 14 resting on a block or support 15.

If desired the plate 14 and block 15 may be made in one piece.

Figure 5:
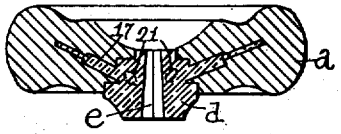

After the softer material or member *d* has cooled or set, the core or former 12 is removed and the composite handle is then ready for use, as represented in Fig. 5.

I prefer to provide the walls of the chamber *b* with substantially radially extended holes or sockets 17, preferably extended to near the circumference of the member *a* and preferably of different diameters, the inner portions of the sockets near the chamber *c* being of larger diameter than the outer portions near the circumference of the member *a*, so as to obtain a stronger connection of the softer filling material or member *d* with the member *a*.

Provision may and preferably will also be made for further strengthening the connection of the softer metal or material or member *d* with the handle proper or member *a*, and this result may be effected by one or more anchoring devices 20 such as steel or iron pins or rods, which are stronger than the soft filling and are inserted into the walls of the chamber *c* and have their inner ends extended into the chamber *c* so as to be surrounded by the softer metal or material *d*, the said inner ends being preferably bent to form anchoring fingers 21, which are embedded in the softer metal or material and serve to resist movement of the softer metal or material with relation to the handle proper or vice versa, when a severe twisting or turning force is applied to the handle in turning the valve. The anchoring devices also serve to retain the parts of the non-metallic member *a* together in case the said member should split.

After the composite handle shown in Fig. 5 has been formed with its parts connected together to form one piece, it may be secured to the valve stem *f* by inserting the angular portion 10 of the stem into the hole or opening *e* through the softer metal or material *d*, so that the threaded end 23 projects out of said opening sufficiently to be engaged by the nut 24, which is turned until the tapering angular portion 10 of the valve stem is drawn up to firmly engage the tapering walls of the opening *e*.

By the term soft metal as used in the claims, I desire to include not only a soft metal or composition of metals, but also such materials as Portland or like cement which are plastic and capable of being worked into the opening in the handle proper and which hardens when set.

Claims.

1. In a handle of the class described, in combination, a non-metallic member provided with a chamber or opening extended through it and of different widths, and having substantially radially extended sockets leading from it, a softer material in said chamber and sockets and provided with a tapering opening of angular cross-section extended through it, and an anchoring device of stronger material than said softer material and secured to the non-metallic member and embedded in said softer material, substantially as described.

2. In a handle of the class described, in combination, a non-metallic member provided with a chamber or opening extended through it and of different widths, a softer material in said chamber provided with an opening through it of angular cross-section, and an anchoring device of stronger material than said softer material and secured to the handle proper and embedded in said softer material, substantially as described.

3. In a handle of the class described, in combination, a non-metallic member provided with an opening extended through it, a softer material in said opening provided with an opening through it of angular cross-section, and an anchoring device of stronger material than said softer material and secured to the handle proper and embedded in said softer material, substantially as described.

4. In a handle of the class described, in combination, a handle proper provided with a chamber or opening extended through it, a different material from the handle proper in said opening, and an anchoring device stronger than said material and secured to the walls of said opening and embedded in said different material, substantially as described.

5. In a handle of the class described, in combination, a handle proper of fibrous material having an opening through it of different widths at its ends and provided with sockets which incline away from the wider end of said opening, a material hardened from a plastic state filling said opening and said sockets and provided with an opening through it, substantially as described.

6. A valve handle of the class described, comprising a non-metallic member having an opening through it and provided with sockets which incline away from one end of said opening into said non-metallic member, and a bushing of a material hardened from a plastic state filling the said opening and sockets and provided with an opening for the reception of the valve stem, substantially as described.

WALTER P. MARBLE.

Witnesses:
JAS. H. CHURCHILL,
J. MURPHY.